(12) United States Patent
Lovegrove et al.

(10) Patent No.: US 9,384,068 B2
(45) Date of Patent: Jul. 5, 2016

(54) PUBLISHING OF AN APPLICATION PROGRAM INTERFACE

(71) Applicant: Release Consulting Limited, London (GB)

(72) Inventors: Will Lovegrove, London (GB); Ian Cox, London (GB)

(73) Assignee: Release Consulting Limited, London (GB)

( * ) Notice: Subject to any disclaimer, the term of this patent is extended or adjusted under 35 U.S.C. 154(b) by 83 days.

(21) Appl. No.: 13/646,438

(22) Filed: Oct. 5, 2012

(65) Prior Publication Data

US 2014/0101676 A1   Apr. 10, 2014

(51) Int. Cl.
*G06F 13/00* (2006.01)
*G06F 9/54* (2006.01)
*G06F 9/44* (2006.01)
*G06F 9/445* (2006.01)

(52) U.S. Cl.
CPC *G06F 9/542* (2013.01); *G06F 8/24* (2013.01); *G06F 9/44521* (2013.01)

(58) Field of Classification Search
CPC .................................. G06F 9/541; G06F 9/542
USPC .................................................. 719/318, 328
See application file for complete search history.

(56) References Cited

U.S. PATENT DOCUMENTS

| | | | |
|---|---|---|---|
| 2005/0183097 A1 | 8/2005 | Carter et al. | |
| 2005/0267901 A1* | 12/2005 | Irlen | 707/100 |
| 2008/0263610 A1* | 10/2008 | Murray et al. | 725/110 |
| 2009/0158238 A1 | 6/2009 | Jung et al. | |
| 2011/0029949 A1 | 2/2011 | Adams et al. | |
| 2012/0232960 A1* | 9/2012 | Smith | 705/7.35 |
| 2013/0246560 A1* | 9/2013 | Feng et al. | 709/217 |
| 2013/0282748 A1* | 10/2013 | Liensberger et al. | 707/766 |
| 2014/0082699 A1* | 3/2014 | Eicken et al. | 726/4 |

FOREIGN PATENT DOCUMENTS

JP    2012073778    4/2012

* cited by examiner

*Primary Examiner* — Andy Ho
(74) *Attorney, Agent, or Firm* — Lowe Graham Jones PLLC

(57) ABSTRACT

A method comprising creating and publishing (H, K) an application program interface (API) enabling access to a dataset from a source data file; determining, by an application, a type of change (E) that has occurred to the source data file; and in dependence at least on a result of said determining, taking at least one action (H, K) relating to permitting subscriber access to the dataset of the changed source data file. The action may comprise permitting subscriber access to the dataset from the changed source data file either: in place of the dataset from the source data file (H), using the API; or by creating and publishing a new API (K). The permitting access to the dataset may also depend on subscriber access controls and/or publication controls under the control of a publishing entity. Changes to datasets may be provided to the application by a file synchronization system.

16 Claims, 14 Drawing Sheets

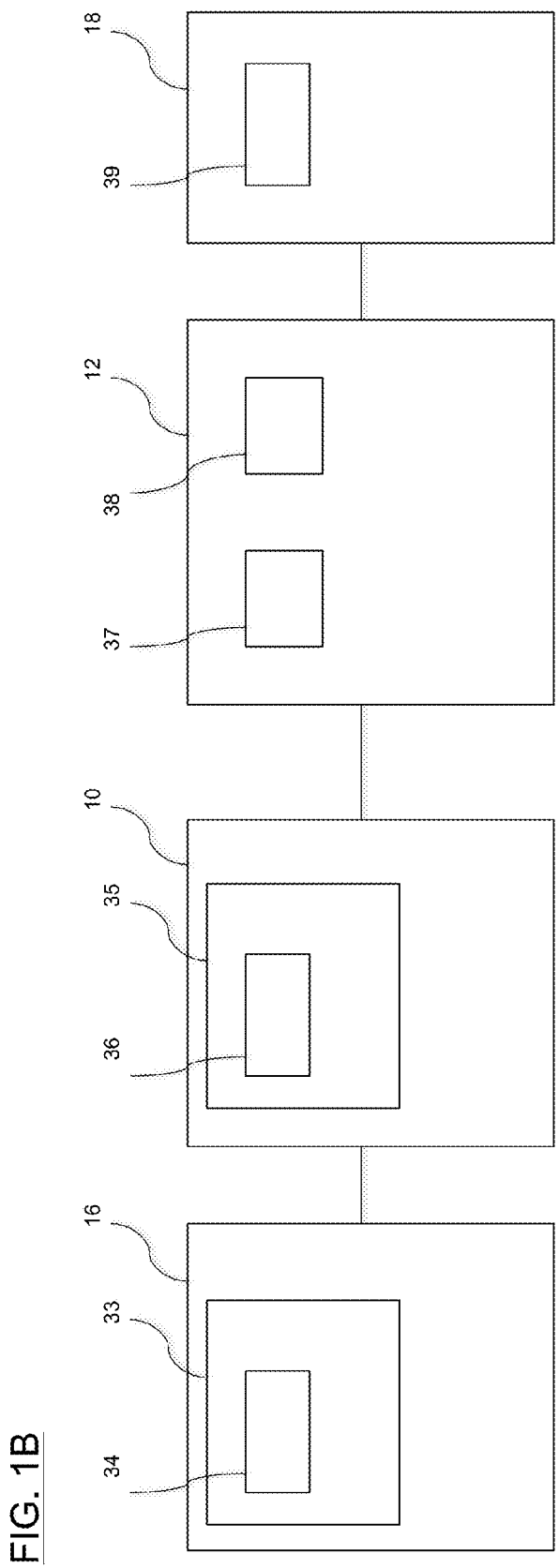

FIG. 5B

| Type of Change | Action |
|---|---|
| New source data file added | 1. Detect "files added"<br>2. Create a new dataset and API for the dataset |
| Changes made and saved to the non-architectural part of an existing data file | 1. Detect "files changed"<br>2. Inspect changed file to determine new, deleted or changed rows<br>3. Apply changes to the dataset, such that the dataset can be access using the current API<br>4. Create Delta API function entries for the changes to the course file |
| Changes made and saved to an existing source data file, changing the architecture of it, | 1. Detect "files" changed"<br>2. Inspect changed file to determine new, deleted or changed column names or change of other part of dataset changing architecture<br>3. Create a new dataset and a new API allowing subscriber access to the dataset |
| A source data file has been deleted | 1. Detect "files deleted"<br>2. Flag dataset API as "Confirm for Delete"<br>3. Data owner needs to confirm delete before API is removed |
| A source data file, previously deleted, is restored | 1. Detect "files restored"<br>2. Create a new dataset and a new API if previous API for deleted source data file had been confirmed as deleted<br>3. Undo the "Confirm for Delete" status if previous API has not been confirmed as deleted |
| A source data file is renamed | 1. Detect "files added and deleted"<br>2. Search for files with different names but same checksum to determine whether a rename has occurred<br>3. Create a new dataset and new API for the added file with the new name<br>4. Flag old dataset API as "Confirm Rename" |

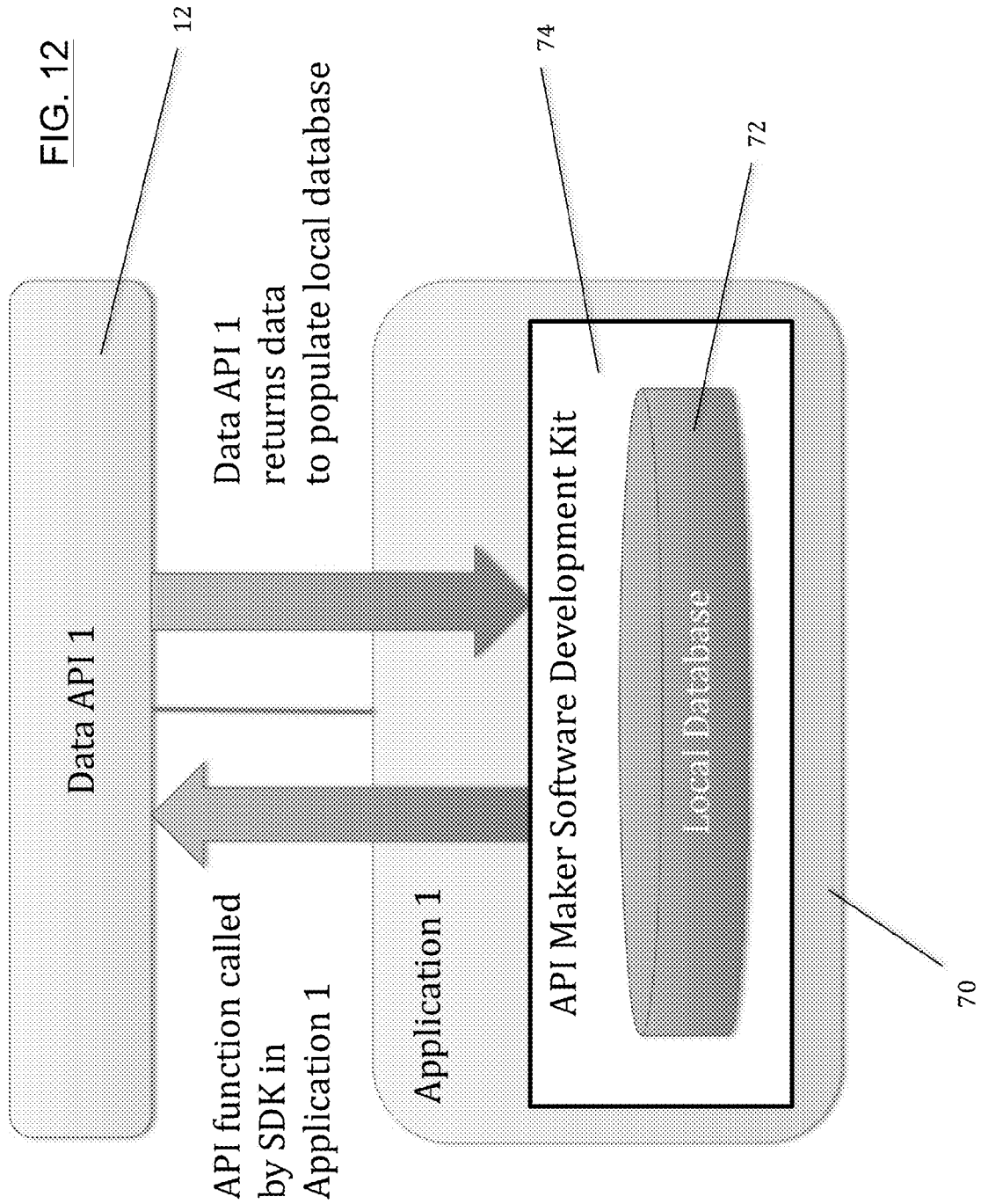

PUBLISHING OF AN APPLICATION PROGRAM INTERFACE

FIELD OF THE INVENTION

The invention relates to a method of, and computer program and system for, creating and publishing an application program interface (API) enabling access to a dataset and handling changes to the dataset.

BACKGROUND

APIs enable data owners to make their data available to others. Increased use of smartphones, apps and cloud-based services is resulting in increased need to develop APIs. APIs are typically custom-built and, as such, are time-consuming and expensive to design and develop, requiring developers with specialist skills not only to construct them but also to maintain them. The likelihood of APIs yielding a return on investment is also difficult for data owners to evaluate, which makes decisions on whether to develop them difficult. These obstacles to development result in many data owners not making their data available to others via APIs, missing potential revenue streams and also preventing multiple business opportunities for potential users of the data.

It is an object of the present invention to provide a straightforward way of enabling data owners to make their data available to others that does not require specialist technical software skills to operate.

SUMMARY OF THE INVENTION

According to a first aspect of the present invention, there is provided a method comprising, at a cloud-based application creating and publishing an application program interface (API) enabling access to a dataset from a source data file, determining, by the application, a type of change that has occurred to the source data file, and in dependence at least on a result of said determining, taking at least one action relating to permitting subscriber access to the dataset of the changed source data file.

According to a second aspect of the present invention, there is provided a computer program comprising computer program code stored in computer-readable storage medium, which when executed by processing apparatus, performs the steps of creating and publishing an application program interface (API) enabling access to a dataset from a source data file, determining, by the application, a type of change that has occurred to the source data file, and in dependence at least on a result of said determining, taking at least one action relating to permitting subscriber access to the dataset of the changed source data file.

According to a third aspect of the present invention, there is provided a system comprising a application program interface (API) creation and publishing system configured to create and publish an API enabling access to a dataset from a source data file, to determine, by the application, a type of change that has occurred to the source data file, and in dependence at least on a result of said determining, take at least one action relating to permitting subscriber access to the dataset of the changed source data file.

According to a fourth aspect of the present invention, there is provided a method comprising, at cloud-based application program interface (API) creation and publishing system, receiving a dataset contained in a source data file by synchronisation with a remotely stored corresponding data file, and creating and publishing a first application program interface (API) enabling access to the dataset.

According to a fifth aspect of the present invention, there is provided a system comprising a application program interface (API) creation and publishing system configured to receive a dataset contained in a source data file by synchronisation with a remotely stored corresponding data file, and create and publish a first application program interface (API) enabling access to the dataset.

According to a sixth aspect of the present invention, there is provided a computer program comprising computer program code stored in computer-readable storage medium, which when executed by a processor, performs the steps of: receiving a dataset contained in a source data file by synchronisation with a remotely stored corresponding data file, and creating and publishing a first application program interface (API) enabling access to the dataset.

BRIEF DESCRIPTION OF FIGURES

For better understanding of the invention, embodiments will now be described, by way of example only, in which:

FIG. 1B is a schematic diagram indicating the locations at which copies of datasets are stored;

FIG. 12 is an illustrative block diagram indicating structure of a developer's computer system with a dataset stored locally.

DETAILED DESCRIPTION OF EMBODIMENTS

Figure 1A:
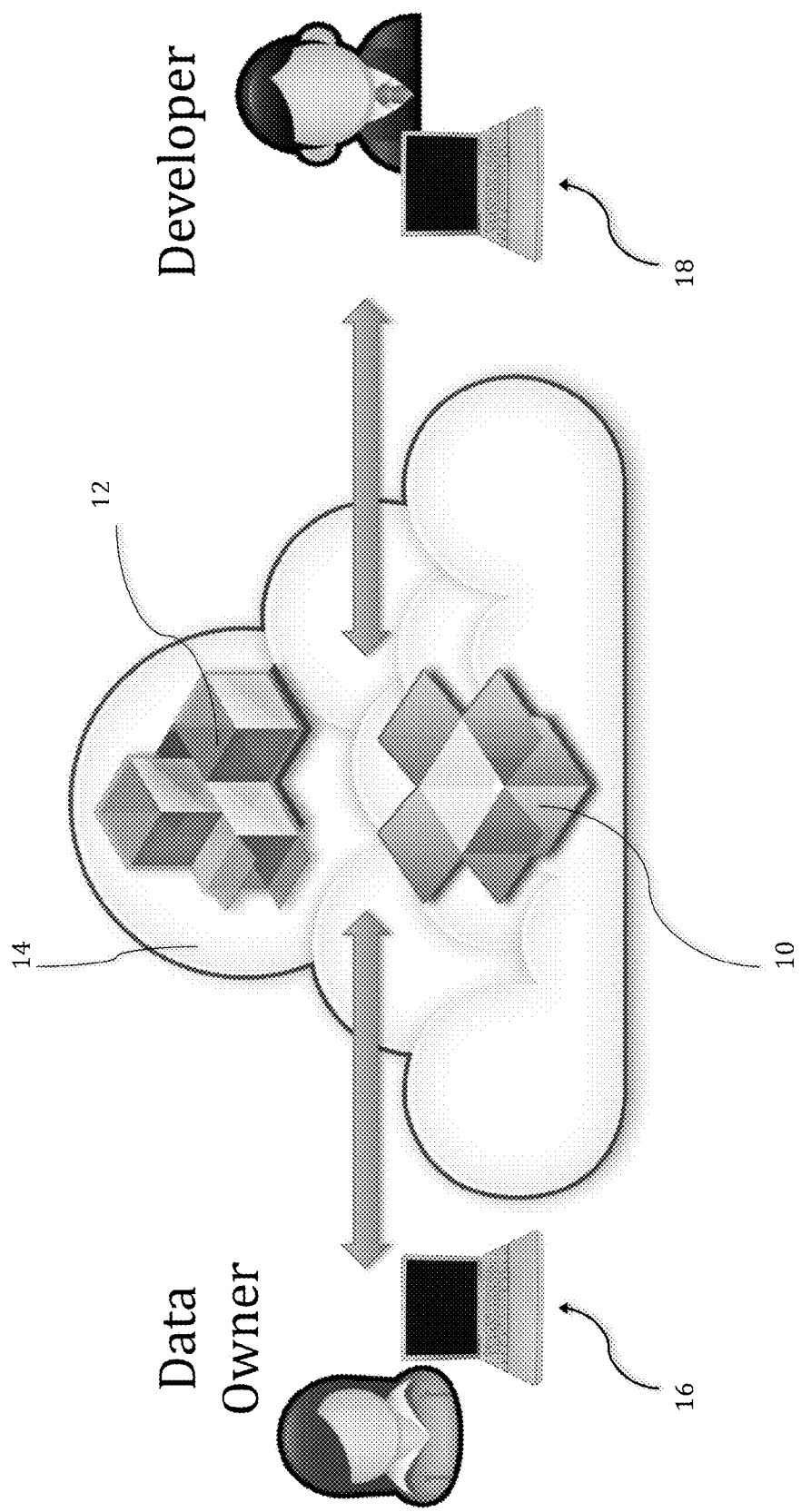
FIG. 1A illustrates diagrammatically flow of datasets between a data owner and a developer.

Like elements are denoted by like reference numerals throughout.

Referring to FIG. 1A, a cloud-based file synchronisation system (FSS) 10 and a cloud-based API creation and publishing system 12, the latter referred to herein as "API Maker", are each connected to a communications network 14. Computer systems 16, 18 respectively of a data owner and a developer are also connected to the communications network 14. By way of general overview, the FSS 10 and the API Maker 12 enable the data owner to make data available to the developer so that the developer can use the data. The API Maker 12 also enables changes to the data to be reflected in the data that is available to the developer.

The communications network 14 is an Internet Protocol (IP) network, but is not limited to being any particular kind of network. The communications network may comprise more than one kind of network. For example, the computer system 16 of the data owner may be connected to a local area network, or, where the computer system 16 is suitably configured, a mobile telecommunications cellular network, which is connected to an IP network.

It will be appreciated that, although only one computer system 16 of a data owner and one computer system 18 of the developer are shown in FIG. 1A, many such computer systems will be connected to the communications network 14 and use the FSS 10 and the API Maker 12. The term "data owner" is used to refer to an entity under who controls publishing of a data set and may include agents of the actual owner of the data.

Figure 2:
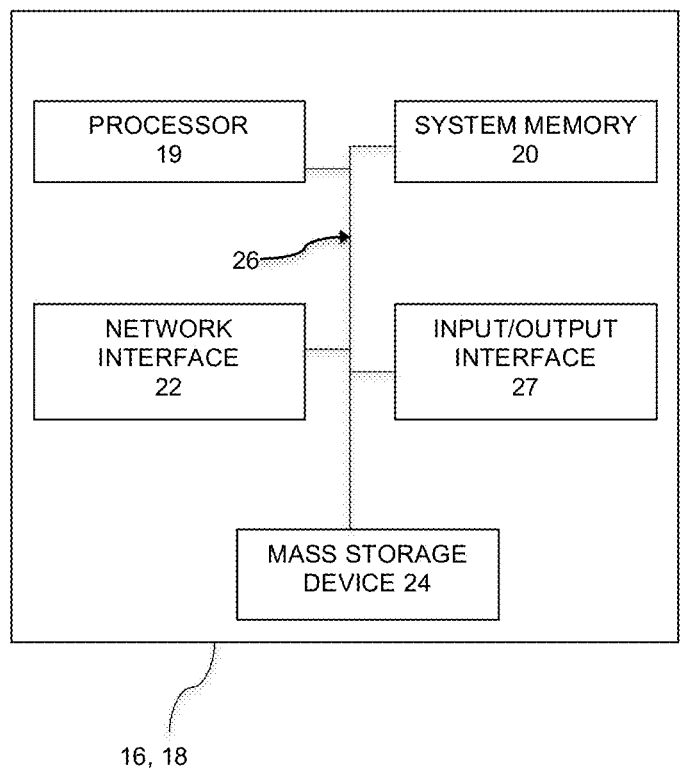
FIG. 2 is a schematic diagram of components of a computer system.

FIG. 2 indicates typical hardware components in the computer systems 16, 18. Each computer system 16, 18 comprises a device that is configured as a server, desktop, mobile device or other device, and include a processor 19, a system memory 20, which includes a random access memory and a read-only memory, a network interface 22 and a mass storage device 24, with a system bus 26 connecting these components. Each computer system 16, 18 also include an input/output interface 27 connected to a user interface, etc. Actions taken by the data owner in publishing its data are performed by operation of the user interface of the computer system 16.

The mass storage device 24 comprises a computer-readable storage medium providing non-volatile storage. The computer-readable storage medium is typically a hard disk, but is not limited to such. The computer-readable medium may include volatile and non-volatile, removable and non-removable media configured for storage of information, such as RAM, ROM, Erasable Programmable Read Only Memory (EPROM), Electrically Erasable Programmable Read Only Memory (EEPROM), flash memory or other solid state memory, CD-ROM, DVD, or other optical storage, magnetic disk storage, magnetic tape or other magnetic storage devices, or any other medium which can be used to store information which can be accessed. The processor may be a single processing unit, or a plurality of connected processing units.

Each computer system 16, 18 further includes programs (not shown) stored in the system memory 20 and the mass storage device 24, including an operating system and a web browser, as well as other programs. The computer system 16 of the data owner includes a client file synchronisation program for use with the FSS 10. The programs are implemented by suitable computer program code (not shown) which, when executed by the processor 19, causes the respective computer system 16, 18 to provide the functionality described herein. Alternatively, the functionality of the programs could be implemented in dedicated processing equipment or a mixture of dedicated hardware and software.

The FSS 10 may be used in a file synchronisation service for general file synchronisation, that is, for synchronising across a plurality of storage devices. A suitable service is provided by the US company "Dropbox Inc" marketed under the brand name Dropbox®. Dropbox is a cloud storage and file synchronisation service, whose software includes the functionality ascribed to the FSS 10 herein. It should however be understood that other file synchronisation services may be used in place of Dropbox. For example, Box.com®, Apple iCloud®, Google Drive® and Microsoft SkyDrive® may be used instead. It should be understood that a person skilled in the art could make any modifications necessary, if any, for another file synchronisation service to be used in place of Dropbox. Where Dropbox is referred to herein, it should be understood that this is by way of example only.

The data owner subscribes to the FSS 10 and has an account therewith. The To synchronise across multiple devices, the FSS 10 typically maintains a copy of the designated FSS folder in its own cloud based storage system. The FSS 10, with the client file synchronisation program, updates the copy when changes are made to files in the designated FSS folder on the computer system 16. In other words, the FSS 10 is configured to synchronise a folder in its own storage system to correspond to the contents of a designated FSS folder on the computer system 16 of the data owner. This is done automatically, that is, without need for user action.

The API Maker 12 is a web application configured to create APIs for datasets and to publish the APIs so that developers can access data owners' datasets.

The API Maker 12 provides a website, known as a 'Developer Portal', for each data owner account. Preferably, the API Maker 12 is configured to allow the data owner to enter and to upload a logo, so that persons wishing to access the data owner's data using an API can do so via the Developer Portal. The API Maker 12 is also configured to allow developers to register at the Developer Portal and to have an account.

The API Maker 12 has a storage system. The FSS 10 and the API Maker 12 are configured to allow the FSS 10 to copy to and maintain the contents of a folder on the storage system of the API Maker 12 so that the contents of the folder reflect the contents of a sub-folder of the designated FSS folder on the data owner's computer system 16. It should be understood that the API Maker 12 and the FFS 10 may be integrated systems, in which case such an additional folder in the storage system of the API Maker 12 would not be necessary.

The block diagram of FIG. 1B illustrates where copies of a dataset may be stored. Thus, referring to FIG. 1B, the storage of the computer system 16 includes a designated FSS folder 33 having a sub-folder 34 ("API Maker folder"). The FSS 10 maintains a copy of the designated FSS folder, indicated at 35, on its storage system and changes in the designated FFS folder 33 on the computer system 16 are copied to the designated folder 35 on the FSS 10. Thus changes in the API Maker folder 34 are copied to an API Maker folder 36 in the designated folder 35 on the FSS 10. The FSS 10 maintains a copy of the API Maker folder 36 on the storage system of the API Maker 12 in synchronicity with the copies on the storage system of the FSS 10 and the API Maker folder 34 on the computer system 16. The folder on the storage system of the API Maker 12 is referred to as the "data owner folder" and is indicated at 37.

The API Maker 12 is configured to extract information, for example datasets or parts of datasets, from source data files stored in the data owner folder 37 when changes occur in the data owner folder 37. Detection that changes have taken place and action that is taken when changes have occurred is described in greater detail below. The extracted data is stored in a database 38 of the API Maker 12.

The API Maker 12 is also configured to enable subscribers to the API to obtain the datasets and/or part of the datasets. A copy of the whole or part of one or more datasets may therefore be stored in a database 39 on the computer system 18.

It will be appreciated that the FSS 10 typically stores designated folders 35 and API Maker folders 36 for many data owners and the API Maker 12 typically stores data owner folders of many data owners.

Alternatively, rather than a designated folder 33 existing on the computer system 16, designated folder may exist solely on the storage system of the FFS 10 in a cloud based storage environment to which the data owner can upload files. Some FSSs available, for example Dropbox® offer this option. The owner of the data and the provider of the FSS are responsible for the configuration of the FSS and the location of the designated folder. Both the FSS 10 and the API Maker 12 are applications that run in a cloud environment, in which their code is stored on computer readable storage media and executed by processing apparatus to provide the functionality described herein.

The data is in a structured form: a 2-dimensional data array, comprising rows, columns and data cells, collectively termed a "dataset". The API Maker 12 is configured to create each API using a dataset extracted from a source data file. In the present embodiment of the invention the source data file may be either a comma separated value (csv) data file, or a Microsoft Excel file. In the case where the source data file is an Excel document then it may be the case that the Excel document consists of one or more datasheets. In this scenario API Maker treats each datasheet as a distinct dataset.

Each dataset held within a source data file includes metadata containing information such as the name of the dataset, the number of rows and the number of columns. The rows of the dataset hold text.

The API Maker 12 is configured to create APIs for datasets stored in the database 38. This includes wrapping each dataset in JavaScript Object Notation (JSON), making the data available via REStful Webservice APIs, and securing it with OAuth2 authorisation technologies although other ways of creating the APIs are possible. Embodiments of the invention are not limited to any particular method.

Figure 3:
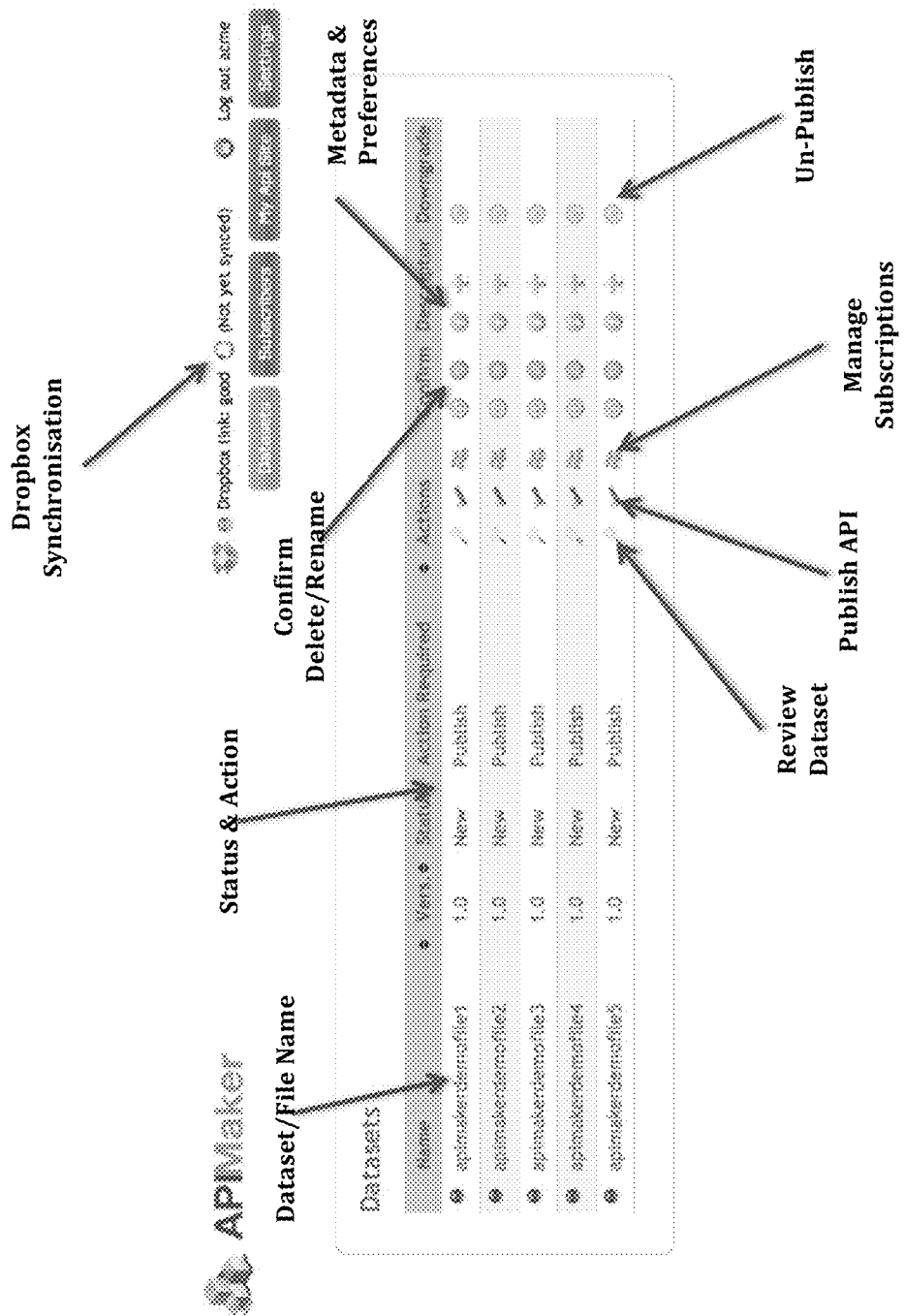
FIG. 3 shows an example of a data owner dashboard used for control of API publishing and of subscriber access.

The API Maker 12 is configured to present an interface to a data owner or developer for each data owner or developer account. The interface is in the form of a dashboard. The data owner dashboard enables the data owner to control publishing of APIs and access to the APIs using publication controls and subscriber access controls. The developer dashboard enables developers to select APIs to subscribe to. Developers may have to request approval from the data owners for each subscription to each API. The data owner dashboard and the developer dashboard allow management of the approval process. An example data owner dashboard is shown in FIG. 3 and the referenced parts are explained below.

In the "dataset/file name" column, the name of the datasets uploaded to the API Maker 12 are indicated. The "Status" and "Action Required" columns respectively together indicate whether a dataset is available to subscribers, whether any changes have been made to the dataset, or whether any action is required to make the dataset available, or to disable the dataset. The "Confirm Delete/Rename" button is present to allow the data owner to confirm before changes that may effect operation of developer's applications are made. In the downgrade column, the data owner may select to "un-publish" an API. By selecting "review dataset", the data owner may review the data in the dataset, for example to check for corruption. The data owner may use the "Publish API" button to publish the API, thereby making the corresponding dataset available to others. Using the "Manage Subscriptions" button, the data owner may manage requests from developers to subscribe to the API corresponding to the button. By selecting the "Descriptor" button, the data owner may modify certain metadata and set preferences.

Preferences (not shown) can be configured in the publication controls so that the API Maker 12 operates in a more manual or more automated manner in accordance with data owner preferences. The preferences can be set so that a new API is automatically published when new source data files are placed in the API Maker folder on the computer system 16. Also, the preferences can be set so that changes to the data part of a source data file are automatically published. Also, any requirement to approve subscription requests can be removed. Where the API Maker 12 includes functionality to notify registered developers of changes, the preferences can be configured so that the developers are automatically notified by email.

The data owner folder 37 of the API Maker 12 is periodically automatically synchronised with changes in the API Maker folder on the computer system 16. In addition a "Immediate Synchronisation" button is made available to 'manually' trigger an immediate re-synchronisation between the API Maker folder 36 of the FSS 10 and the data owner folder 37 of the API Maker 12 so that its record of contents of the files accurately reflects the files in the API Maker folder on the storage system of the FSS 10.

To detect changes in a data owner folder 37 of the API Maker 12, the API Maker is configured to periodically poll a Delta API function provided by the FSS 10, which indicates to changes in the API Maker folder 36. The Delta API function may provide information about the state of the folder, for example time of last update. Alternatively, the Delta API function may provide more detailed information, for example indicate specific changes to specific source data files.

In alternative embodiments, the metadata of the folder hierarchy may be monitored. Alternatively, the FSS 10 may notify the API Maker 12 when changes occur. Other ways of detecting changes in a folder are possible. In further alternatives, particular source files may be monitored for changes than whole folders.

The API Maker 12 is configured to determine the type of change that has occurred. A non-limiting list of types of change is set out in FIG. 5B. This table indicates the contents of a table that the API Maker 12 maintains in its system database of all possible types of changes that may be made to a source data file on FSS and associated actions that can be taken. This includes changing the name, deleting the source data file, adding data to a source data file, editing data in a source data file, removing data from a source data file, and restoring a source data file. Each change listed in the database has a corresponding action to be taken in the API Maker 12. In this way, the API Maker 12 translates the changes to the state of a source data file, or the data contained within a source data file, into a set of instructions that are applied to the data set of the API associated with the source data file.

Where the API Maker 12 detects that a dataset in a source data file has been changed, the API Maker 12 also determines whether certain architectural configuration information of the source data file has changed in order to determine the type of change. When the API Maker 12 detects a source data file has changes, the API Maker 12 is configured to compare the dataset stored in its database 38 with the dataset in the corresponding changed source data file in the data owner folder 37. Change of certain architectural configuration information will mean that changes will be necessary to developers' applications to accommodate the changes to the source data file. Accordingly, where the type of change involves a change to a source data file including a change to predetermined architectural configuration information, a new API is created. Where the type of change involves a change to a source data file and there is no change to the predetermined architectural configuration information, a new API need not be created; the dataset for the source file in the database 38 can be updated and the current API can continue to be used.

Each API contains Meta data. The Meta data includes file header type information, such as version, timestamps, row count, etc. The Meta data also includes data record type information, such as field name list, field order, etc. An example of the Meta data fields that may be used to describe an API are as follows:

| Field | Meaning |
| --- | --- |
| _id | Filename and version |
| _rev | Internal checksum of file |
| fieldList | Lists the API fields in the order that they appear in the API. The columns in the source file are alphabetically sorted when the API is created |
| fieldListDocOrder | Lists the API fields in the original column order of the source file |
| name | Informal name of an API |
| published | Indication of whether API has been published |
| fileSize | Size of the original source file in its original format |
| fileCreated | The date and timestamp of when an API was first created |
| fileModified | The date and timestamp of when an API was last updated |
| fileRevision | fileRevision is a number which is incrementally increased whenever a change to the source data file is detected. This is used by API Maker to correctly identify what version of a file it is working on (because simply using 'filename' is not accurate enough). |
| fileName | The name and extension of the original source file used to create an API |
| rows | The number of data rows in an API |
| contentChecksum | A unique checksum which is generated by API Maker and associated with the source data file. When changes are made to the source data file, API Maker recalculates the contentChecksum and compares it with a previous historical version. API Maker uses this comparison to help interpret actions on the source data file and translate them into system actions. For example, if the two contentChecksums are different then API Maker knows a content change has taken place. |
| timestamp | The date and timestamp of the last time anything changed for an API |
| seq | The latest delta sequence number. This is to be used in conjunction with the Delta API described below in section 5 |
| root | This term applies to the root name of a filename associated with a dataset. It is used when the source data file has originated from an Excel file in which there are multiple datasheets. In this case the root 'name' is the name of the Excel file and the extracted datasets are named according to the name of the datasheets in the Excel document. |
| apiVersion | The version number of an API |
| type | The type of source file used to generate and API Currently set to "document" in this version of API Maker |
| limit | The number of rows returned in an API Method This will be based on: A limit that was specified when making the original call The actual number of rows in an API if less than 200 The default maximum of 200 if no limit specified and more than 200 data rows in an API |
| offset | The starting point row number of the returned results This will be the same as specified on the original call or zero if not specified |
| pageNumber | The number of pages in an API based on the limit specified or defaulted. EG. pageNumber = 5 if API contains 1000 rows and limit = 200 |
| pageCount | The current page number within an API based on limit and offset EG pageCount = 3 if API contains 1000 rows and limit = 200 and offset = 400 |
| numRowsInContents | The number of rows returned in the result contents array for an API method request |

Each API is RESTful and is constructed in accordance with standard API practices, such as offset and limit parameters for paging.

By way of example, the URL of the API may be formatted as follows: https://www.datownia.com/api/doc/{publisher}/v1/{document}?offset=25&limit=0. In this URL, the publisher is the name of the organisation (typically the data owner) that is publishing the data in the API. The version is the version number of the source data file (e.g. v1). The version number increments when the architectural configuration of the API has been changed, for example fields have been added or removed. The filename is the name of the source data file that was used to create the API. This is usually meaningful and describes the data that is in the API and is typically the same name that appears on a dataset list in the data owner's API website. Where the data file is an Excel file, an example URL of the API may be formatted as follows: https://www.datownia.com/api/doc/{publisher}/v1/{root}/{sheet}?offset=25&limit=0.

The first time that a data owner uses the API Maker 12, a set up process is performed. If the data owner does not already subscribe to the FSS 10, for example Dropbox, the data owner is required to. This results in the computer system 16 of the data owner having a designated FSS folder 33 in which files can be stored, and the contents of the folder is automatically synchronised with the corresponding designated folder 35 on the storage system of the FSS 10. Thus any changes made to the designated folder 33 are mirrored in the folder 35 on the storage system.

Figure 4:
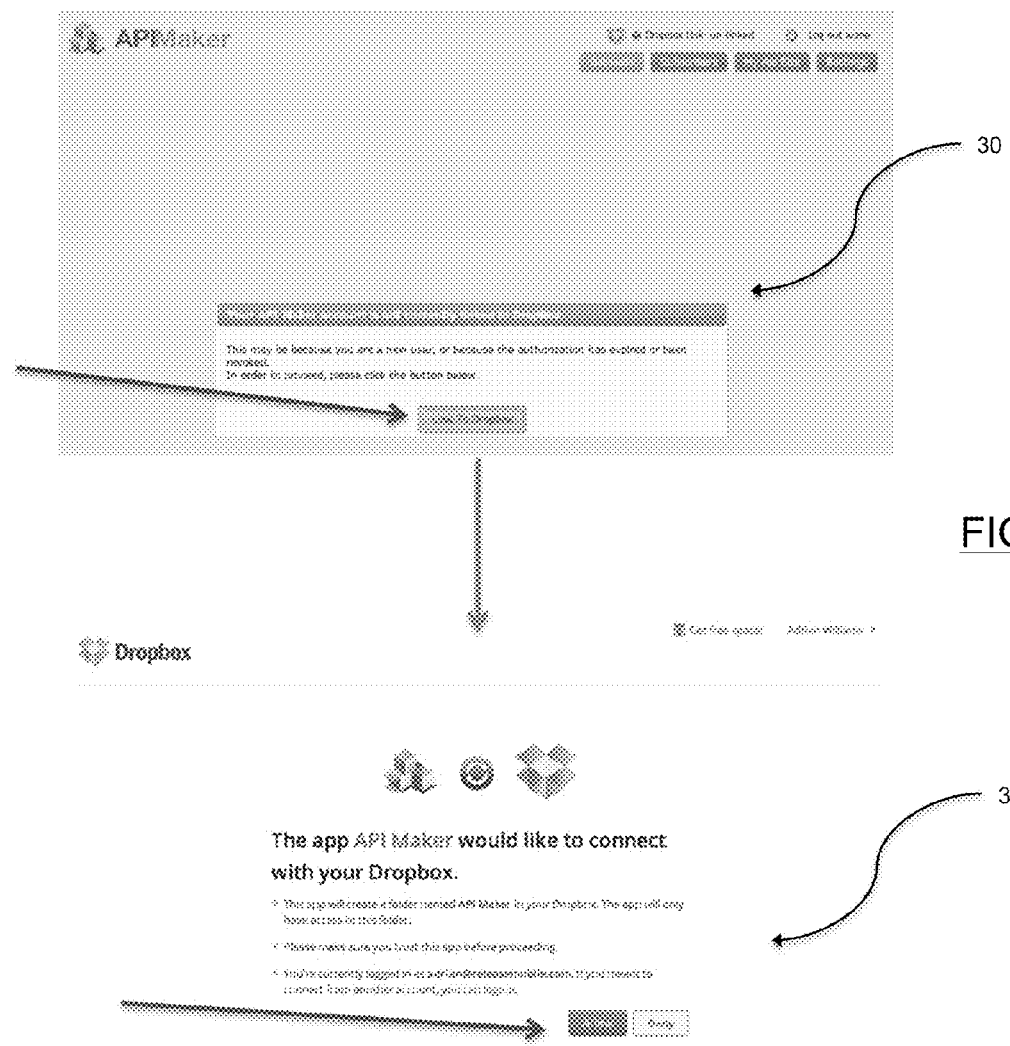
FIG. 4 shows example requests presented to the data owner.

When the data owner registers with the API Maker 12, the API Maker 12 sends a request for authorization to connect with the designated folder 35 on the FSS 10. The request may be presented to the data owner on the computer system 16 as shown at 30 in FIG. 4. The data owner accepts the request. The FSS 10 then sends to the data owner a request for authorization for the API Maker 12 to connect. This request may be presented to the data owner on the computer system 16 as shown at 32 in FIG. 4. Provided the data owner accepts, the API Maker 12 creates the "API Maker folder" 36 within the designated folder 35. The FSS 10 also grants API Maker 'data read' and 'data write' permissions to and from the "API Maker folder" in the designated folder on the FSS. In an alternative embodiment in which the FSS 10 and the API Maker 12 are integrated, it will be understood that permissions do not have to be requested.

Figure 5:
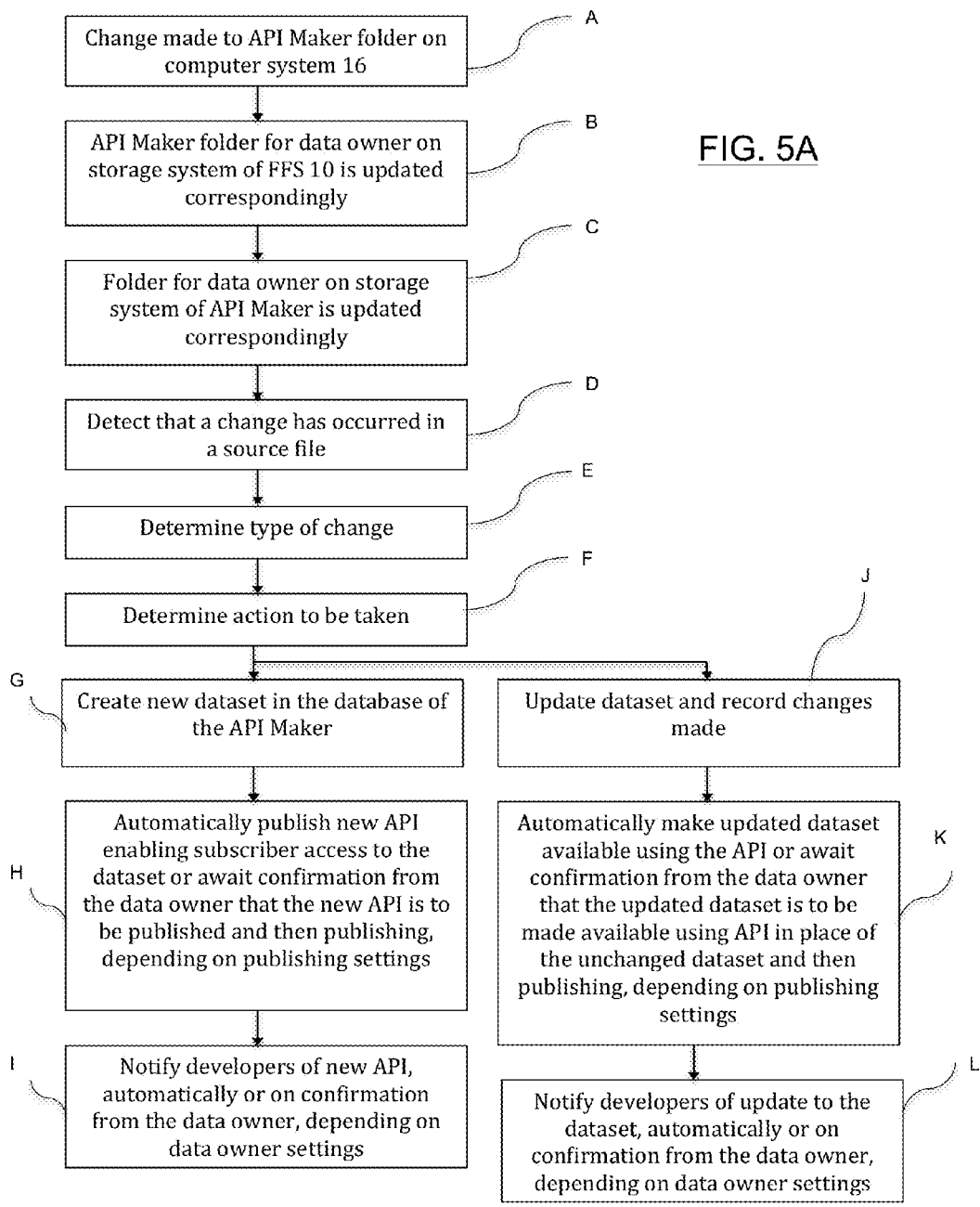
FIG. 5A is a flow diagram indicating steps taking place in accordance with an embodiment of the invention.
FIG. 5B is a table indicates types of change to which a source data file can be subject.

Steps involved in creating and publishing a new API or in updating an existing API will now be described with reference to FIG. 5A. At step A, the data owner makes a change in the API Maker folder 34. The data owner may add a new source data file, change an existing data source file, delete a source data file, rename a source data file, or restore a previously deleted source data file. For example, to add a new source data file, the data owner can drag-and-drop into the API Maker folder 34. The FFS 10 then synchronises the API Maker folder 36 in the storage of the FSS 10 at step B and also the data owner folder of the API Maker 12 at step C.

Figure 9:
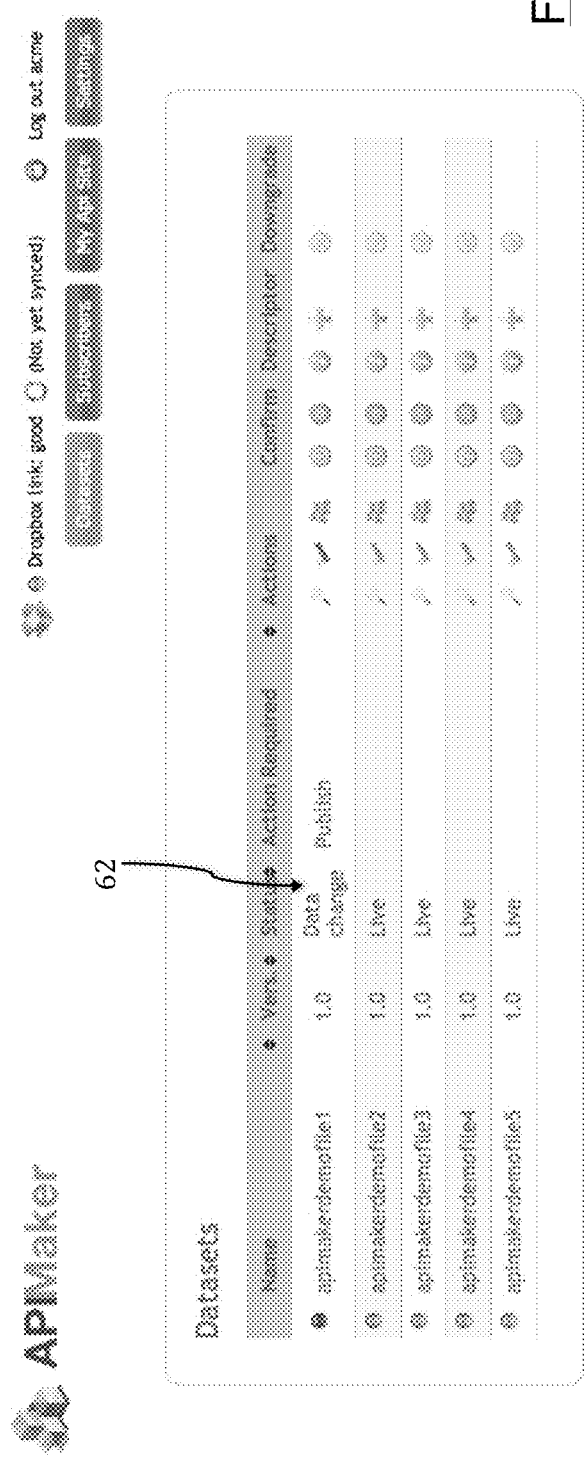
FIGS. 9 and 10 show example of a data owner dashboard including indications of status of datasets.
Figure 10:
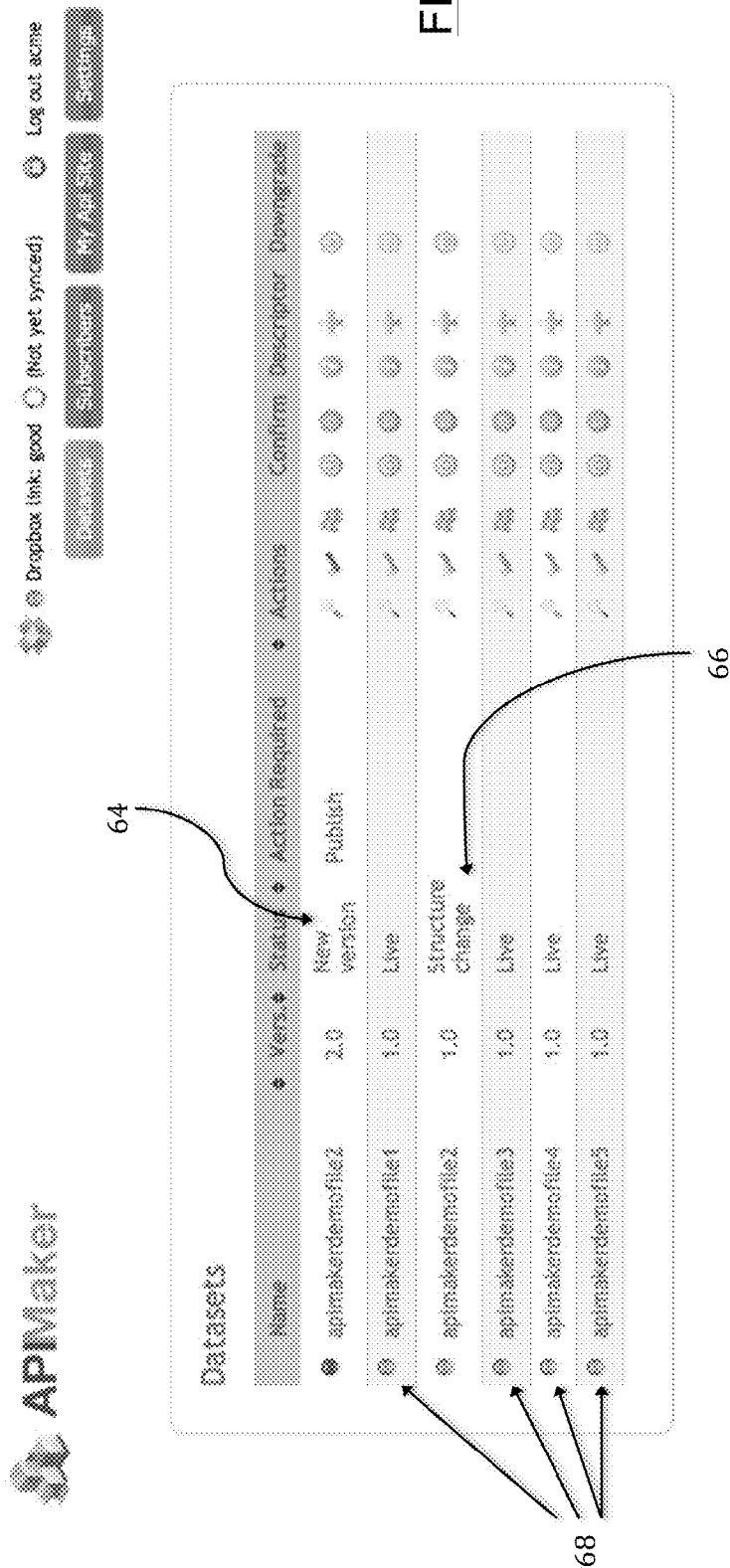

The API Maker 12 periodically checks for changes to source files. At step D, the API Maker 12 then determines that a change has occurred in the data owner folder or to a particular source file and determines at step E a type of change. Determining the type of change can be done in various ways. The API Maker 12 determines at step F the action to be taken in view of the type of change with reference to a stored copy of the table indicated in FIG. 5B. Depending on the type of change, the API Maker 12 then either creates a new dataset in the database 38 and creates a new API for the dataset (step G), or makes changes to an existing dataset and enables subscribers to access the changed dataset using the existing API for the dataset (step J). The new API or the existing data can then be made available to subscribers automatically, or upon confirmation from the data owner via the data owner dashboard (steps H and K). In steps I and L, developers are notified of the new API or the updated API. In step G, it should be understood that the new API may be considered to be a new version of an existing API.

Where a source data file has been changed and saved, the API Maker determines whether predetermined architectural configuration information has changed. The types of change and corresponding action that is taken will now be described in greater detail.

a) When the API Maker 12 determines in step E that the type of change is the addition of a new source data file, the API Maker 12 extracts the dataset from the new source data file on the storage system of the API Maker 12, stores it in its database 38, and indicates the existence of a new dataset on the data owner dashboard.

b) When in step E the API Maker 12 determines that a source data file has been updated and determines that the predetermined architectural configuration information is the same, the changes can simply be made to the dataset stored in the database 38. This is achieved by comparing the existing dataset in the database 38 with the dataset in the source data file in the data owner folder 37 and generating information indicative of the differences. The API Maker 12 then updates the dataset in the database 38 using the information. Such changes to the dataset in the source data file may be automatically recognized and interpreted by the API Maker 12 and applied to the API by selecting the "publish" icon. Alternatively, the API Maker 10 may be configured so that any such changes in the dataset for a published API are automatically published. An example dashboard indicating that such change have been made to a dataset is indicated at 62 in FIG. 9.

c) When in step E the API Maker 12 determines that the predetermined architectural configuration information has changed, for example because new columns have been added to the dataset in the source data file or a column has been deleted or the name of a column has been changed (which is treated as addition of a new column and deletion of a previous column), the API Maker 12 creates a new version of the API separate from the currently active API. Where developers are using the currently active API, the act of creating a new version of the API prevents impact on their work products which will continue to operate with the previous version of the API. The developers may be notified of the architectural changes and given an opportunity to modify their work products to work with the new version of the API. The developers may then switch to using the new version of the API. The data owner dashboard displays when developers have stopped using the earlier version of the API and allows deactivation of the earlier version. An example data owner dashboard is shown in FIG. 10. An unpublished second version of a dataset having architectural changes is indicated at 64 and an earlier version of that dataset is indicated at 66. Datasets that are currently accessible through their corresponding APIs are indicated at 68, as well as at 66.

c) Another type of change is removal of a source data file. An API can be disabled by removing a source data file from the API Maker folder. In this case, the data owner is requested to confirm that the API is to be disabled by asking for the data owner to select a "confirm delete" button. If an API is disabled, developers will not be able to access it any more. Alternatively, the data owner can disable an API by selecting "un-publish". Alternatively, removing a file from the API Maker folder may automatically disable the corresponding API.

d) Another type of change is a rename. The API Maker 12 searches for differently named files having the same checksum to determine whether a rename has occurred. In this case, the API Maker 12 extracts a dataset from the renamed source data file and creates a new dataset and a new API for that dataset. Alternatively, if the source data file is renamed, the API Maker 12 may request, via the dashboard, for confirmation that the API for the dataset is to be published with the new name, and whether or when to disable the API for the dataset with the original name.

Renaming a file to the name of a previous file having a corresponding API and removing the previous file, provided the predetermined architectural configuration information for both files is the same, results in a switch of dataset from which the API is created. Any application using the original dataset will then use the new dataset.

If a sub-folder is created within the API Maker folder, but it does not contain any source data files, then API Maker takes no action. If a source data file is moved to a sub-folder within the API Maker folder then this is handled by the API Maker 12 as if the source data file has been renamed.

e) If a source data file that has been removed from the data owner folder 37 is to be restored, the API Maker 12 requests, via the dashboard, whether to create a restored version of the dataset with the same name and then allow to re-publishing of the API.

When an API for a new or changed dataset is to be published, an indication thereof is visible on the data owner dashboard. Using the dashboard the data owner then preferably reviews the data that was uploaded to ensure that the data that was intended for upload has been uploaded. The data owner then preferably adds descriptive text to the dataset and usage terms and conditions.

To publish an API for a dataset, the data owner selects a "publish" icon on the data owner dashboard corresponding to the dataset. The API is then published to the Developer Portal of the data owner. The data owner can then send to a link to the Developer Portal to any potential subscribers to the API.

Figure 6:
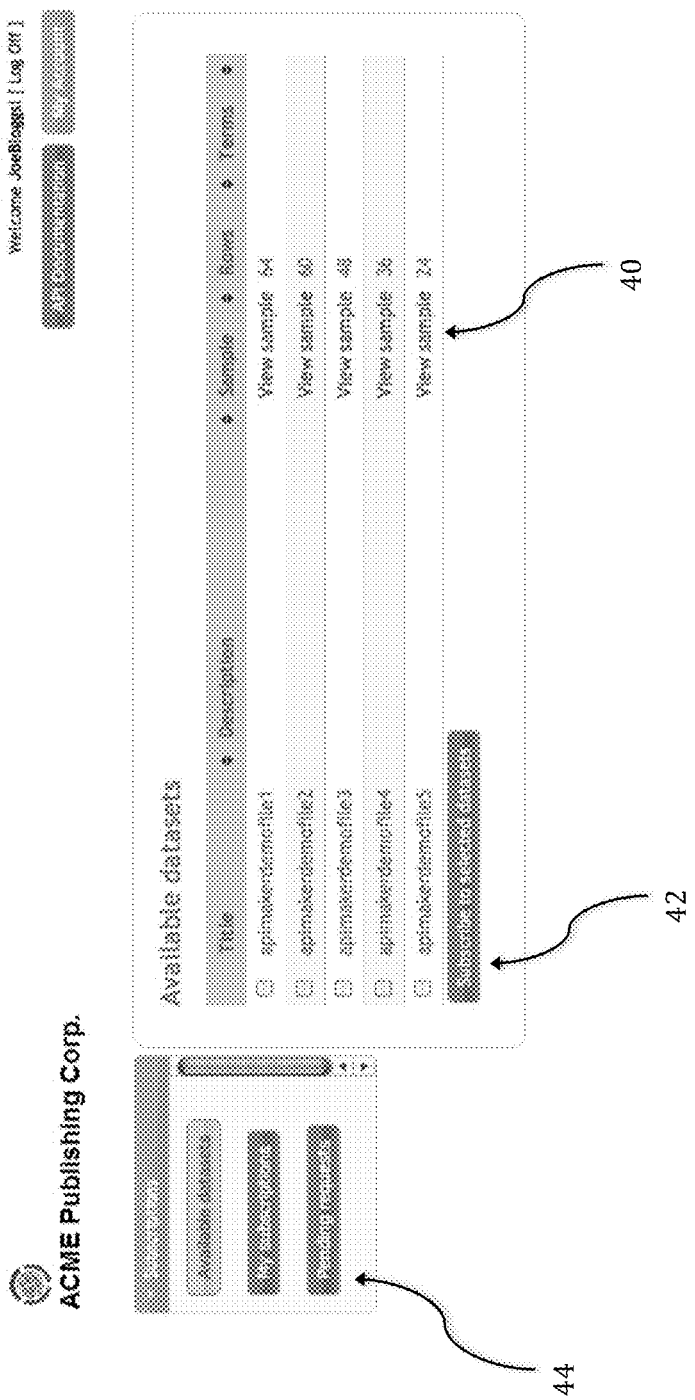
FIG. 6 shows an example of a developer dashboard for managing subscriptions.

Developers can access the Developer Portal to view information on the or each API that the data owner has made available. An example view of the developer dashboard on the Developer Portal is shown in FIG. 6. As can be seen at 40, developers may be able to view a sample of the data available for each API. If the registered developer selects at button 42 to subscribe to one or more datasets of a particular data owner, a request is sent to the data owner for approval to subscribe. Pending requests can be viewed by selecting on the button 46.

Figure 7:
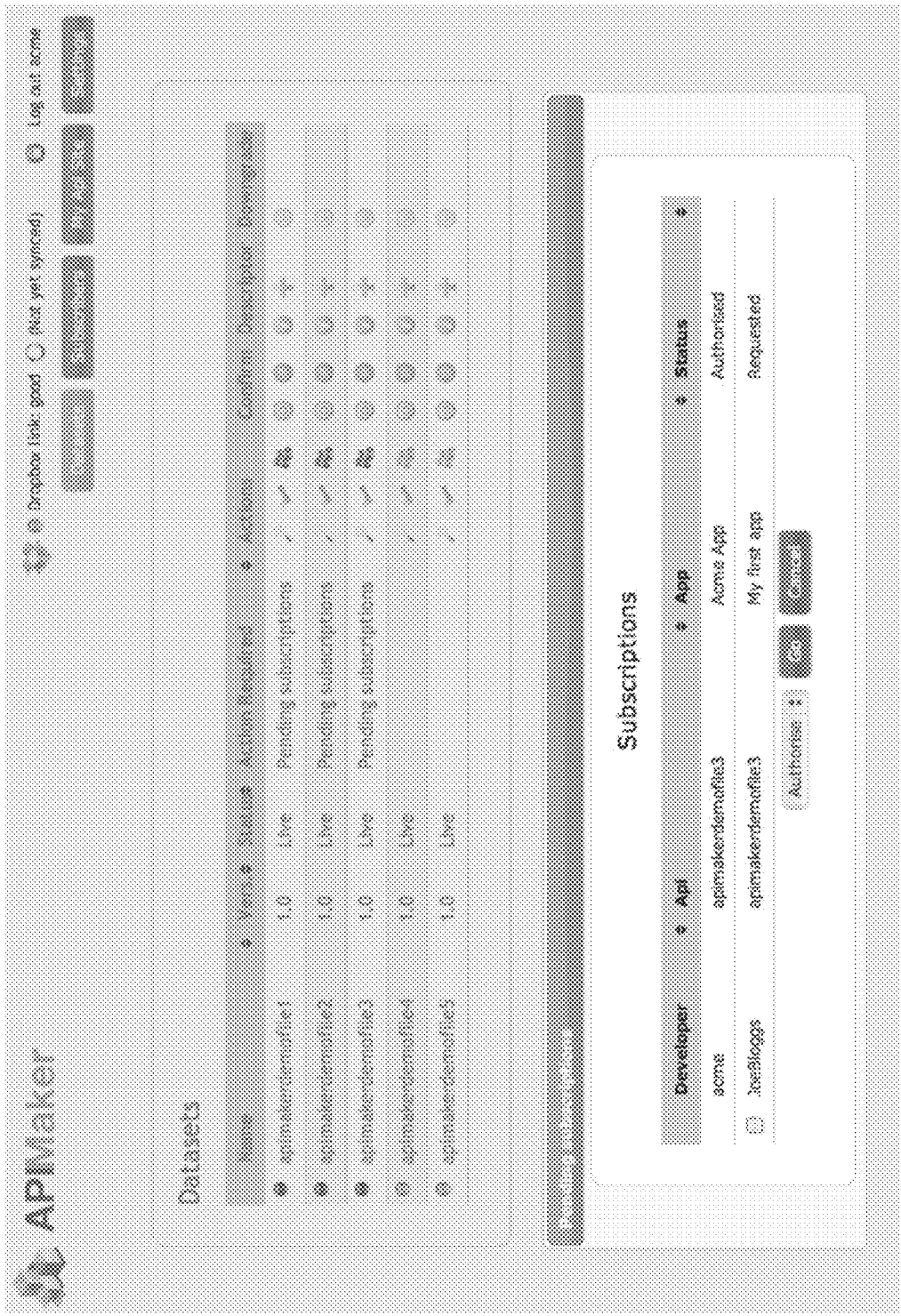
FIG. 7 shows an example of a data owner dashboard including a part for managing subscriptions.
Figure 8:
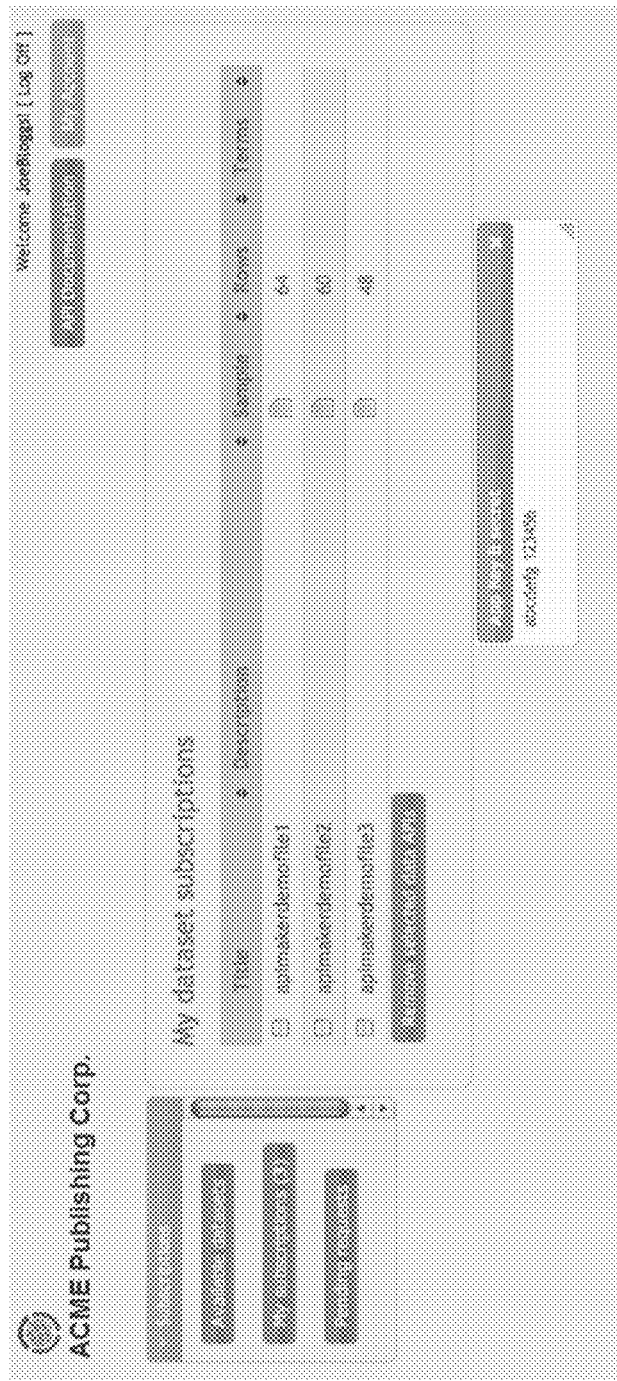
FIG. 8 shows an example of a developer dashboard including a part in which authentication information can be accessed.

Requests to subscribe received from developers can be managed on the data owner dashboard. Requests which have been authorised are also shown and can be cancelled. An example dashboard is shown FIG. 7 with a section for "Subscriptions".

The API Maker 12 allows a common set of API functions for every dataset it accepts as input and subsequently processes. In the embodiment, the set of API functions does not change or vary between datasets. API Maker is able to do this because its API functions are designed to work with any 2-dimensional dataset regardless of meaning of the data held in the dataset.

Supported API functions may include, by way of example:
Entire dataset: Returns the entire dataset, along with document metadata.
Entire dataset as Sqlite: Returns the entire dataset as a table within a sqlite database.
All App datasets as Sqlite: Returns a sqlite database download of all datasets that the specified app is subscribed to, represented as tables.
Metadata only: Returns metadata about the dataset, only. This method returns no data rows.
Sample rows: Returns the first two data rows of the dataset, along with metadata.
Search field value: Searches the document by a field value. This method returns a list of search results along with document metadata.
Search field range: Searches the document by a field value range. This method returns a list of search results along with document metadata.
Search by query: Searches the document using a Lucene query. Field names are case sensitive, but values are not. This method returns a list of search results along with document metadata.
Delta: Returns a list of deltas for the dataset. If a sequence number is provided, the API returns deltas from that value onwards.
Delta SQL: Returns a list of deltas for the dataset as SQL statements. If a sequence number is provided, returns deltas from that value onwards.
Delta search: Returns a refined list of deltas for the dataset. If a cursor is provided, the API returns deltas from that value onwards.

Each request or call made to an API function from a Developer's application must be authenticated or recognized, through the use of a digital security key, before the function returns a value. The API Maker 12 creates and assigns the digital security key to a Developers software application. The API Maker 12 maintains a database table that creates an association between an API and one or more digital security keys that are approved to access that specific API. When a request from a developer to subscribe their application to a specific API is approved by the data owner, then the API Maker 12 makes a record in its database which associates all of the API's functions with the digital security key associated with the application created by the developer. If authentication fails, because the digital security key is not associated with the specific API, then the API function will returns an error or null value. If authentication is successful, because the digital security key is associated with the specific API, then the API function will execute normally.

The API Maker 12 permits a Developer to register one or more applications with the API Maker 12. Each application can be associated with any number of APIs created by the API Maker 12. The associated APIs may belong to one or more data owners. To achieve this the API Maker 12 permits a single Developer account and the applications created in association with that account to be logically independent of the data owner accounts.

Figure 11:
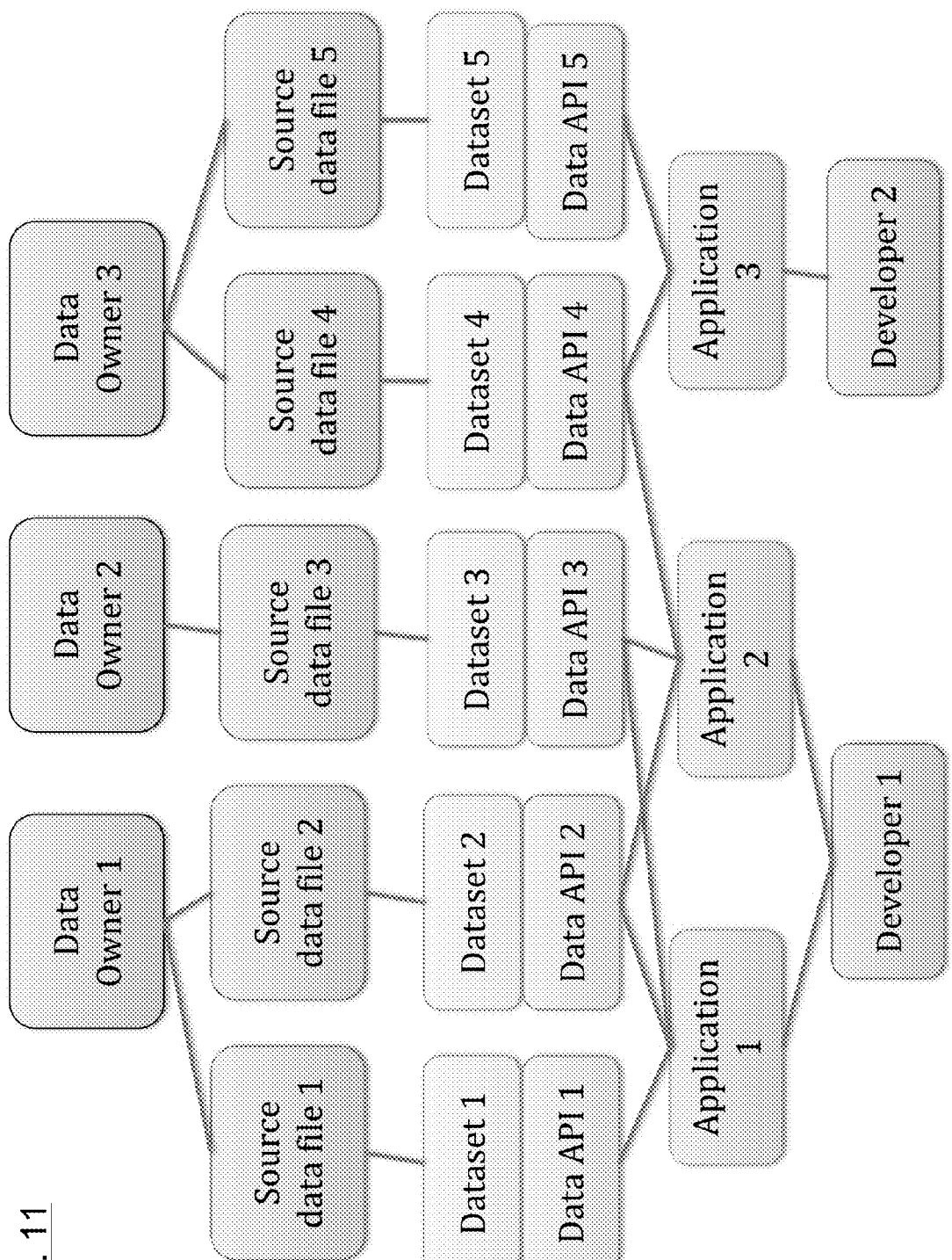
FIG. 11 is a flow diagram illustrating the relationships between publishers, datasets, applications and developers.

Examples of publisher to subscriber relationships can be seen in FIG. 11. As can be understood, a developer can, for each application developed, subscribe to more than one dataset through each corresponding API.

In a specific implementation, the API Maker 12 may use OAuth 2 for authentication purposes and require developers to enable OAuth 2 client integration when calling the API. The authentication key and secret are used to verify each API call. Each application requires only one set of keys and those allow authentication for all APIs that have been approved for use by that application.

Embodiments of the invention usefully allow each API to be updated with data, and 'managed' on an ongoing basis, via the interpretation of changes to files and folders on the FSS 10. Embodiments advantageously enable API creation and ongoing management of APIs to be conducted remotely via the interpretation of data and file systems changes on the data owners copy of the dataset, held in source data files, and on an FSS 10 which is remote to the API Maker system.

Usefully, a data owner may use the API Maker 12 to automatically update its own website where the website is configured to use a dataset through the API. Thus, the data owner need only modify data in a source data file in order to effect changes on the website.

It should be understood that the data in the source data file may reference content located elsewhere on the Internet. Thus, textual and non-textual content on websites may be provided and updated using the API Maker 12.

Data owners are automatically authorized to have access to their own APIs.

Referring to FIG. 12, some applications, for example as indicated at 70, keep a local cached copy of a dataset accessed using an API. This means that any changes made to the data part of the dataset of an API may need to be applied to those local copies. The API Maker 12 includes a cached data support module (CDSM) which integrates into the appropriate API functions to simplify the work effort required to make the data changes in the local copies.

The CDSM is made available to developers in a downloadable Software Development Kit 74. The Software Development Kit comprises a database 72 (which accurately includes datasets reflecting the structure of all the 'API Maker' data APIs to which an application using the CDSM is subscribed) and some software that assists the developer maintain an accurate synchronised local copy of the datasets that are provided by the APIs to which the application is subscribed.

The software in the Software Development Kit 74 integrates into a Delta API function that is made available by the API Maker 12 for every dataset.

The Delta API function contains a list of every new or removed data row for an API since it was first published. A change to a data row is represented as a removal of the row with the old data values and an addition of a data row with the new values.

The Delta API function is ordered in the sequence that the changes were applied to an API and identified by a sequence number "seq". This sequence number is used when calling the Delta API function to return the correct set of Delta API records that need to be applied.

The API Maker 12 uses a row identifier key ("_id") to uniquely identify each row of data in an API. This key is also used in the Delta API function. The Delta API function will identify data rows to be deleted by the identifier key only, that is, the rows are empty.

The API Maker 12 is configured so that to access the Delta API function a term is added to the path in the API Maker URL. For example, where the term chosen is "delta" the URL is: https://www.datownia.com/api/doc/{publisher}/v1/delta/{document}?seq=1&offset=20&limit=0.

In the embodiment, the data in an API can be downloaded as SQlite instead of JSON. This is achieved by appending "sqlite" to the filename in the API Maker URL as follows: https://www.datownia.com/api/doc/{publisher}/v1/delta/{document}.sqlite The returned database contains a table named the same as the filename with the version number appended. The primary key of the table in this case is also the row identifier ("_id").

The Delta API function can be configured to return either JSON or a set of SQL statements in the SQlite download.

An example of the Delta API function, for a specific dataset, text in rows of which has been changed is as follows:

```
Request: /api/doc/customer99/v1/delta/testdocument1?seq=0 (i.e. give me
all the deltas since seq 0)
Returns:
[
  {
    "_id": "e51431cc-0114-4ea6-bca1-306b3f755771__1.0__delta__1",
    "_rev": "1-68f3a51785506ce2e4f1807dc13d9948",
    "type": "delta",
    "parent": "e51431cc-0114-4ea6-bca1-306b3f755771__1.0",
    "seq": 1,
    "action": "delete",
    "data": "a6a8580a6619cb36205d0a2c7b037be9"
  },
  {
    "_id": "e51431cc-0114-4ea6-bca1-306b3f755771__1.0__delta__2",
    "_rev": "1-541c1d9f71ebae277d1b04fe9ca64627",
    "type": "delta",
    "parent": "e51431cc-0114-4ea6-bca1-306b3f755771__1.0",
    "seq": 2,
    "action": "insert",
    "data": {
      "name": "Battery",
      "sku": 328143,
      "stock level": 10,
      "warehouse": "york",
      "_id": "f83b140aa934e650febeec76cb2c53f7"
    }
  }
]
IF action = "delete" THEN the data is the "_id "of the row that
needs deleting
IF action = "insert" THEN the data is the data for the row that
needs inserting
```

In the event of error when an API is called, the following error codes may be sent to the computer system 18 of the developer.

| Error Code | Error Reason |
|---|---|
| 200 | Okay |
| 400 | Problem with request - in terms of bad method call |
| 401 | Not authorised |
| 404 | Not Found |
| 500 | Problem with request - in terms of temporal issue, may be resolved by repeat |

In an embodiment, the computer system 18 may be a mobile device, and is required to operate offline. When the computer system 19 is online, it uses the software development kit (CDSM) 74 to synchronise the corresponding current dataset with the local data held in the local database. In the event that the computer system 18 is to be used offline, the application is configured to store a copy of the dataset in the local database. When the computer system 18 is online again, it automatically connects to the API Maker 12 using the API and updates the local database in view of any changes using the Delta API.

The application therefore functions properly when the computer system 18 is offline. Further, advantageously, querying a local database is much faster than querying over the internet. Therefore, data from the API can be obtained by the application more quickly. Where an internet connection is unstable, or if the API Maker 12 suffers an outage, the application continues to function properly. No bespoke hosting is required to keep the application running.

It will be appreciated by the person skilled in the art that various modifications may be made to the embodiments described above. In particular, the embodiments may be modified to avoid need for the FSS 10. In this case, with reference to FIG. 5A, in place of steps A to C, the data owner may upload files to the data owner folder 37 on the storage of the API Maker 12, and in place of step D, the API Maker 12 may be configured to determine whether changes have occurred in the data owner folder 37. Steps E to M are as described with reference to FIG. 5A.

The applicant hereby discloses in isolation each individual feature or step described herein and any combination of two or more such features or steps, to the extent that such features or steps or combinations are capable of being carried out based on the present specification as a whole in the light of the common general knowledge of a person skilled in the art, irrespective of whether such features or steps or combinations of features or steps solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer-implemented method comprising:
   receiving by an application a copy of a source data file, by transfer under the control of a data synchronization system, from a computer system under the control of a publishing entity;
   creating and publishing an application program interface (API) enabling access to a dataset from the source data file;
   making a change to the source data file at the computer system by the publishing entity, the copy being updated under the control of the data synchronisation system;
   determining, by the application, a type of change that has occurred to the source data file from a predetermined plurality of types; and in dependence at least on a result of said determining, taking at least one action relating to permitting subscriber access to the dataset of the changed source data file, wherein the at least one action comprises permitting subscriber access to the dataset of the changed source data file in place of the dataset from the source data file, using the API.

2. The computer-implemented method according to claim 1, wherein, said permitting access to the dataset is also in dependence on subscriber access controls and/or publication controls under the control of the publishing entity.

3. The computer-implemented method according to claim 1, wherein the dataset has an architectural configuration and includes information on said architectural configuration, wherein determining the type of change comprises:
   determining that a change has occurred to the source data file; and
   determining whether at least a predetermined portion of the architectural configuration has changed.

4. The computer-implemented method according to claim 3, wherein, if the at least a predetermined portion of the architectural configuration has changed, the at least one action comprises permitting subscriber access to the dataset from the changed source data file is by creating and publishing a new API.

5. The computer-implemented method according to claim 3, wherein, if the at least a predetermined portion of the architectural configuration has not changed, the at least one action comprises permitting subscriber access to the dataset from the changed source data file in place of the dataset from the source data file, using the API.

6. The computer-implemented method according to claim 5, further comprising:
   determining differences between the dataset of the source data file and the dataset of the changed source data file; and
   updating the stored dataset based on information indicative of the differences.

7. The computer-implemented method according to claim 5, further comprising:
   recording, by the application, information indicative of differences between the changed dataset and the dataset, and providing a delta API function enabling access to said information.

8. The computer-implemented method according to claim 1, wherein the type of change is a change to the name of the dataset of the source data file, and wherein the at least one action comprises permitting subscriber access to the dataset from the changed source data file by creating and publishing a new API.

9. The computer-implemented method according to claim 1, wherein the at least one action comprises permitting subscriber access to the dataset from the changed source data file by creating and publishing a new API, and wherein the method further comprises disabling, under the control of the publishing entity, access to the API.

10. The computer-implemented method according to claim 1, wherein the type of change is removal of the data source file, the method further comprising disabling access to the API.

11. The computer-implemented method according to claim 10, further comprising:
    wherein the source data file is restored following removal thereof, the permitting comprises permitting access to the dataset using the API, wherein the API is re-published under the control of the publishing entity.

12. The computer-implemented method according to claim 1, further comprising:
    receiving the dataset in the source data file and before the creating of the API, extracting and storing the dataset in a database.

13. A computer program comprising computer program code stored in computer-readable storage medium, which when executed by processing apparatus, performs the steps of:
    receiving by an application a copy of a source data file, by transfer under control of a data synchronization system, from a computer system under the control of a publishing entity;
    creating and publishing an application program interface (API) enabling access to a dataset from the source data file;
    making a change to the source data file, under the control of the data synchronization system;
    determining, by the application, a type of change that has occurred to the source data file from a predetermined plurality of types; and
    in dependence at least on a result of said determining, taking at least one action relating to permitting subscriber access to the dataset of the changed source data file, wherein the at least one action comprises permitting subscriber access to the dataset of the changed source data file in place of the dataset from the source data file, using the API.

14. A system comprising:
    an apparatus having a processor and a memory, the memory containing stored programming instructions comprising an application program interface (API) creation and publishing system configured to:
    receive by an application a copy of a source data file, by transfer under control of a data synchronization system, from a computer system under the control of a publishing entity;
    create and publish an API enabling access to a dataset from the source data file;
    make a change to the source data file, under the control of the data synchronization system;
    determine, by the application, a type of change that has occurred to the source data file from a predetermined plurality of types; and
    in dependence at least on a result of said determining, take at least one action relating to permitting subscriber access to the dataset of the changed source data file wherein the at least one action comprises permitting subscriber access to the dataset of the changed source data file in place of the dataset from the source data file, using the API.

15. The system according to claim 14, further comprising a computer system of a second entity subscribing to the API, wherein the computer system is configured to obtain copies of the dataset and changes thereto using the API and to store said copies in a database of the computer system.

16. The system according to claim 15, wherein the changes are obtained using a delta function of the API.

* * * * *